(12) United States Patent
Laye et al.

(10) Patent No.: US 7,836,026 B2
(45) Date of Patent: Nov. 16, 2010

(54) METHOD, APPARATUS AND SOFTWARE FOR VERIFYING A PARAMETER VALUE AGAINST A PREDETERMINED THRESHOLD FUNCTION

(75) Inventors: Christophe Laye, Valbonne (FR); Frederic Eynard, Grasse (FR); Christophe Garcia, Valbonne (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 11/785,711

(22) Filed: Apr. 19, 2007

(65) Prior Publication Data

US 2007/0250185 A1  Oct. 25, 2007

(30) Foreign Application Priority Data

Apr. 20, 2006 (EP) .................................. 06300385

(51) Int. Cl.
  *G06F 7/00* (2006.01)
  *G06F 17/00* (2006.01)
(52) U.S. Cl. ...................................... 707/688; 702/182
(58) Field of Classification Search ................. 707/688
  See application file for complete search history.

(56) References Cited

U.S. PATENT DOCUMENTS

2003/0120764 A1* 6/2003 Laye et al. .................. 709/223
2006/0276995 A1* 12/2006 Breitgand et al. ........... 702/179

* cited by examiner

*Primary Examiner*—John R. Cottingham
*Assistant Examiner*—Nicholas E Allen

(57) ABSTRACT

A method, apparatus or software are disclosed for verifying a parameter value against a predetermined threshold function in which a sequence of reference values is retrieved, each reference value being associated with a respective sampling point N, said reference values representing a threshold function at said respective sampling points N; a profile type is associated with said threshold function, said profile type being arranged, when combined with said sequence of reference values, to provide an approximation to said threshold function for a region of said threshold function between said reference values; a parameter value is received for verification against said threshold function, said parameter value being associated with a discrete time P; said sequence of reference values is combined with said profile type to provide an approximation of said threshold function; and said parameter value is verified against said approximation of said threshold function.

12 Claims, 4 Drawing Sheets

METHOD, APPARATUS AND SOFTWARE FOR VERIFYING A PARAMETER VALUE AGAINST A PREDETERMINED THRESHOLD FUNCTION

This application claims priority from European patent application 06300385.9, filed on Apr. 20, 2006. The entire contents of the aforementioned application is incorporated herein by reference.

FIELD OF INVENTION

The present invention relates to a method, apparatus or software for verifying a parameter value against a predetermined threshold function.

BACKGROUND OF THE INVENTION

Complex systems such as computer systems or telecommunications systems, which provide services to customers, commonly include a Service Quality Management (SQM) system. The SQM system is arranged to monitor key performance criteria and measure them against predetermined thresholds, which define levels of performance. A set of thresholds may be agreed between a service provider and a customer and defined in a Service Level Agreement (SLA). Each criterion or threshold within an SLA may be referred to as a Service Level Objective (SLO).

Data for measuring SLOs is collected via measurement points within the system being monitored, which periodically return data or parameter values. The SLO defines the set of one or more threshold levels that delineate parameter values and thus define levels of performance. Multiple threshold levels can be used for providing quantified monitoring of service quality. Unacceptable SLO values are flagged and reported in the SQM system to enable their cause to be rectified. The thresholds defined by a SLO may be fixed values, variable values based on time or some other variable. The thresholds may vary constantly or undergo ramp or step changes in value. SLOs may be measures derived from various types of data such as static historical data or dynamic current data.

SLAs are often modified or varied to take into account changes in the service being monitored. As a result of such modifications, the SLA may become more complex, for example, if the SLO is changed from a constant threshold to a time based threshold. These changes may incur a significant overhead since the elements of the SQM system, which monitor and measure the SLOs need to be re-engineered.

SUMMARY OF THE INVENTION

An embodiment provides a method for verifying a parameter value against a predetermined threshold function, the method comprising the steps of:

a) retrieving a sequence of reference values, each reference value being associated with a respective sampling point N, the reference values representing a threshold function at the respective sampling points N;

b) associating a profile type with the threshold function, the profile type being arranged, when combined with the sequence of reference values, to provide an approximation to the threshold function for a region of the threshold function between the reference values;

c) receiving a parameter value for verification against the threshold function, the parameter value being associated with a discrete time P;

d) combining at least some of the sequence of reference values with the profile type to provide an approximation of the threshold function; and e) verifying the parameter value against the approximation of the threshold function.

The sequence of reference values may comprise three reference values but in step d) only the two reference values associated with sampling points N closest to the time P are combined with the profile type. The sequence of reference values may comprise three reference values, each associated with respective sampling points N−1, N and N+1, and the method may comprise a further step of comparing the time P to the sampling points and if N<=P<=N+1, then replacing the reference value N−1 with a new reference value N+2 for use with a subsequently received parameter value. The sequence of reference values may comprise three reference values, each associated with respective sampling points N−1, N and N+1, and the method may comprise a further step of comparing the time P to the sampling points and if P<N+1, then replacing the sequence with a further sequence of reference values N'−1, N' and N'+1 for use in step e). The sequence of reference values may comprise only two reference values.

Another embodiment provides apparatus for verifying a parameter value against a predetermined threshold function, the apparatus being operable to:

retrieve a sequence of reference values, each reference value being associated with a respective sampling point N, the reference values representing a threshold function at the respective sampling points N;

associate a profile type with the threshold function, the profile type being arranged, when combined with the sequence of reference values, to provide an approximation to the threshold function for a region of the threshold function between the reference values;

receive a parameter value for verification against the threshold function, the parameter value being associated with a discrete time P;

combine at least some of the sequence of reference values with the profile type to provide an approximation of the threshold function; and verify the parameter value against the approximation of the threshold function.

A further embodiment provides software arranged to enable a programmable device or group of such devices to carry out a method for verifying a parameter value against a predetermined threshold function, the method comprising the steps of:

a) retrieving a sequence of reference values, each reference value being associated with a respective sampling point N, the reference values representing a threshold function at the respective sampling points N;

b) associating a profile type with the threshold function, the profile type being arranged, when combined with the sequence of reference values, to provide an approximation to the threshold function for a region of the threshold function between the reference values;

c) receiving a parameter value for verification against the threshold function, the parameter value being associated with a discrete time P;

d) combining at least some of the sequence of reference values with the profile type to provide an approximation of the threshold function; and e) verifying the parameter value against the approximation of the threshold function.

Another embodiment provides software arranged to enable a programmable device or group of such devices to provide apparatus for verifying a parameter value against a predetermined threshold function, the apparatus being operable to:

retrieve a sequence of reference values, each reference value being associated with a respective sampling point N, the reference values representing a threshold function at the respective sampling points N;

associate a profile type with the threshold function, the profile type being arranged, when combined with the sequence of reference values, to provide an approximation to the threshold function for a region of the threshold function between the reference values;

receive a parameter value for verification against the threshold function, the parameter value being associated with a discrete time P;

combine at least some of the sequence of reference values with the profile type to provide an approximation of the threshold function; and verify the parameter value against the approximation of the threshold function.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
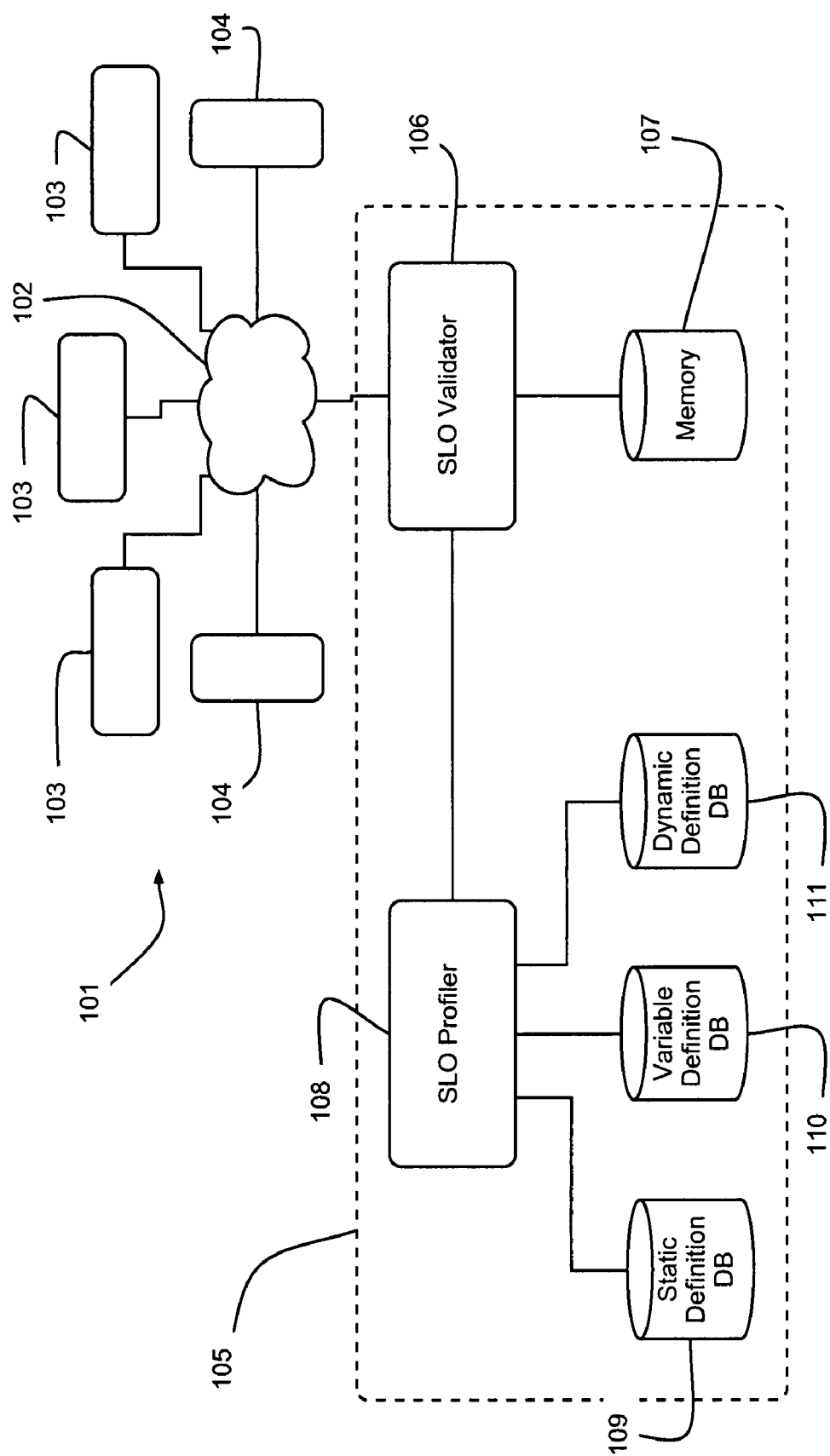
FIG. 1 is a schematic illustration of a computer system and a service quality management (SQM) system.

With reference to FIG. 1, a computer system 101 comprises a network 102 interconnecting network elements in the form of server computers 103 and client computers 104. The servers 103 are arranged to provide services to the client computers 104 under an SLA. The SLA is managed by a SQM system 105 connected to the network 102.

The SQM system comprises a SLO validator 106, with associated memory 107, connected to a SLO profiler 108. The SLO profiler 108 has access to SLO definitions managed by different systems in the form of a static definitions database 109, a variable definitions database 110 and a dynamic definitions database 111. The SLO validator 106 is arranged to receive parameter values from the network elements 103, 104 for a given set of SLOs and to compare these parameter values against corresponding SLO thresholds. The parameter values are received from measurement points (not shown) in the computer system 101. Threshold components are supplied to the SLO validator 106 by the SLO profiler 108. The SLO profiler extracts these threshold components from the SLO threshold for the relevant SLO definitions from the databases 109, 110, 111.

Figure 2A:
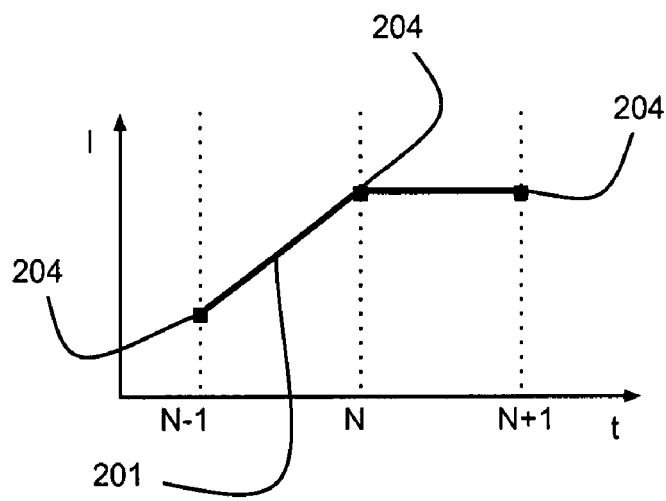
FIGS. 2a, 2b & 2c are a set of graphs illustrating data used by the SQM system of FIG. 1.
Figure 2B:
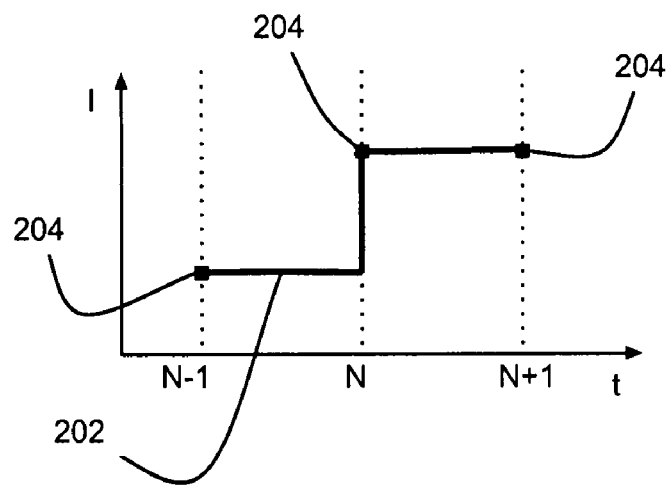
Figure 2C:
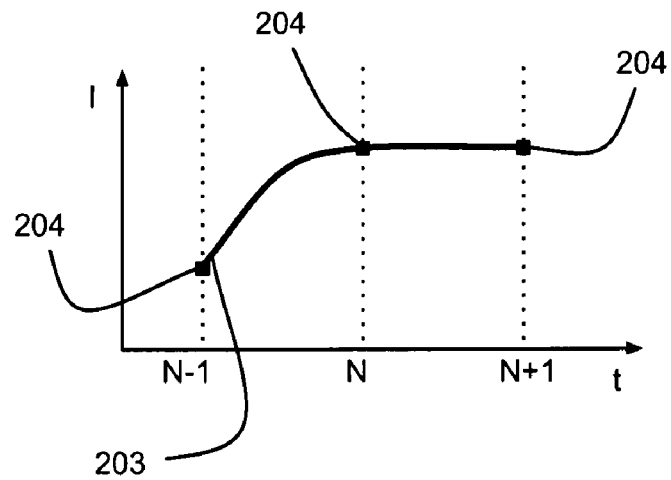

With reference to FIGS. 2a, 2b and 2c, the threshold components supplied by the SLO profiler 108 to the SLO validator 106 for each SLO comprise one of three threshold profiles 201, 202, 203 and a number of reference values 204. The three threshold profiles 201, 202, 203 are defined in the SLO profiler 108 in the form of a ramp profile 201, a step profile 202 and a curve profile 203. One of the threshold profiles 201, 202, 203 is associated with a given SLO threshold depending on its profile. For example, if the SLO is based on data which changes at a constant rate against time then the ramp profile 201 may be associated with that SLO threshold. For example, the SLO threshold may define a minimum call response time target for operators in a call centre, where the target is gradually increased or decreased depending on demand. If the SLO threshold is based on data which changes instantaneously at spaced time intervals then the SLO threshold may be associated with the step profile 202. For example, the SLO threshold may define a maximum call response time in a call centre, where between 8 am and 6 pm the threshold should be less than 1 hour and between 6 pm and 8 am should be less than 8 hours. If the SLO is based on data which changes at a variable rate over time then the SLO threshold may be associated with the curve profile 203. For example, the SLO threshold may define a maximum average call response time in a call centre which varies with both time and the number of telephone operators.

The reference values 204 are obtained by sampling the threshold function for a given SLO threshold at three sampling points N. In the present description, the three sampling points are time based and referred to in ascending time order as sampling points N−1, N and N+1. The corresponding reference values are referred to respectively as reference values N−1, N and N+1.

The SLO profiler 108 is arranged to sample the SLO threshold function in response to a request from the SLO validator 106. This request identifies a given SLO and includes a time stamp P, which identifies a discrete time. The SLO profiler 108 is also arranged to keep a record of the last sampling point 204 that was sent to the SLO validator. This last sampling point 204 can then be compared to the time stamp P so that appropriate contemporaneous reference values 204 can be supplied to the SLO validator in response to a request.

The SLO validator 106 is arranged to combine the contemporaneous reference values (N−1, N, N+1) 204 with the associated threshold profile 201, 202, 203 in order to reconstitute a portion of the SLO threshold function for a time period that includes the time stamp P. The time stamp P is obtained by the SLO validator from an incoming parameter value. Thus a parameter value for the given SLO can be compared to this reconstituted threshold function in order to determine if the parameter value is within the acceptable limit defined by the original SLO.

Figure 3:
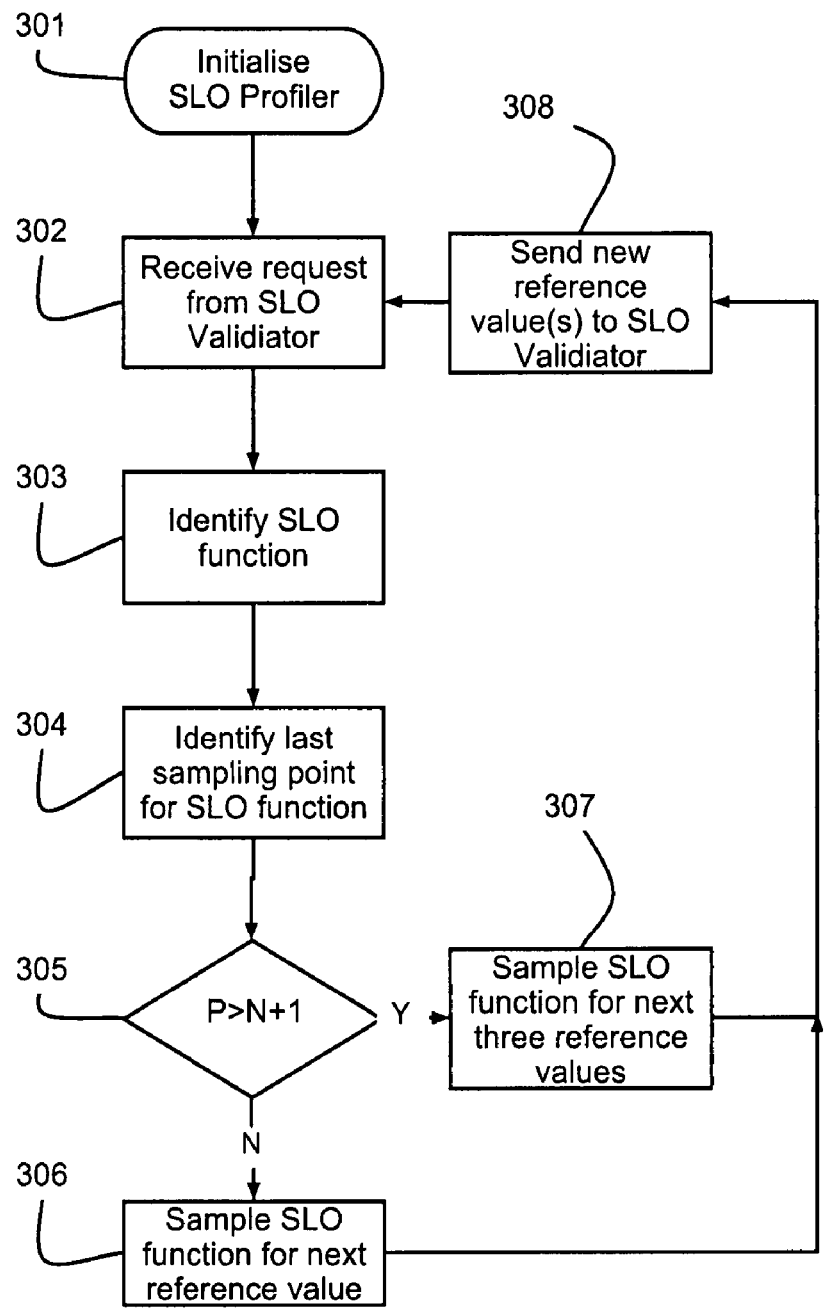
FIGS. 3 & 4 are flow diagrams illustrating processing carried out by the SQM system of FIG. 1.

The processing carried out by the SLO profiler 108 will now be described in further detail with reference to the flow chart of FIG. 3. At step 301, the SLO profiler 108 is initialised by defining the SLO definitions, stored in the databases 109, 110, 111, which represent the threshold functions for one or more SLOs. Also, each SLO threshold function is associated with one of the threshold profiles 201, 202, 203 and the sampling point N is set. Processing then moves to step 302 to wait for a request from the SLO validator 106 for new reference values 204. When a request is received, processing moves to step 303 where the request is inspected to identify a SLO and a time stamp P. Processing then moves to step 304 where the last sampling point N+1 for the SLO is identified.

Processing then moves to step 305 where the time stamp P is compared to the sampling point N+1. If the time stamp P is earlier than, or equal to, sampling point N+1 then processing moves to step 306 where the threshold function is sampled at the next sampling point N+2 to produce a further reference value. If at step 305, the time stamp P is later than N+1 then processing moves to step 307. If the request received at step 302 is the first request from the SLO validator 106 then there will be no stored value for N+1. In this special case, N+1 is assigned a null time so that processing moves from step 305 to step 307. At step 307, the threshold function is sampled at three sampling points for which the first two are contemporaneous with P. In other words, where N−1<=P<N. Processing then moves from either step 306 or step 307 to step 308 where the newly generated reference value or values are sent to the SLO validator 106. Processing then returns to step 302 to await a further request as described above.

Figure 4:
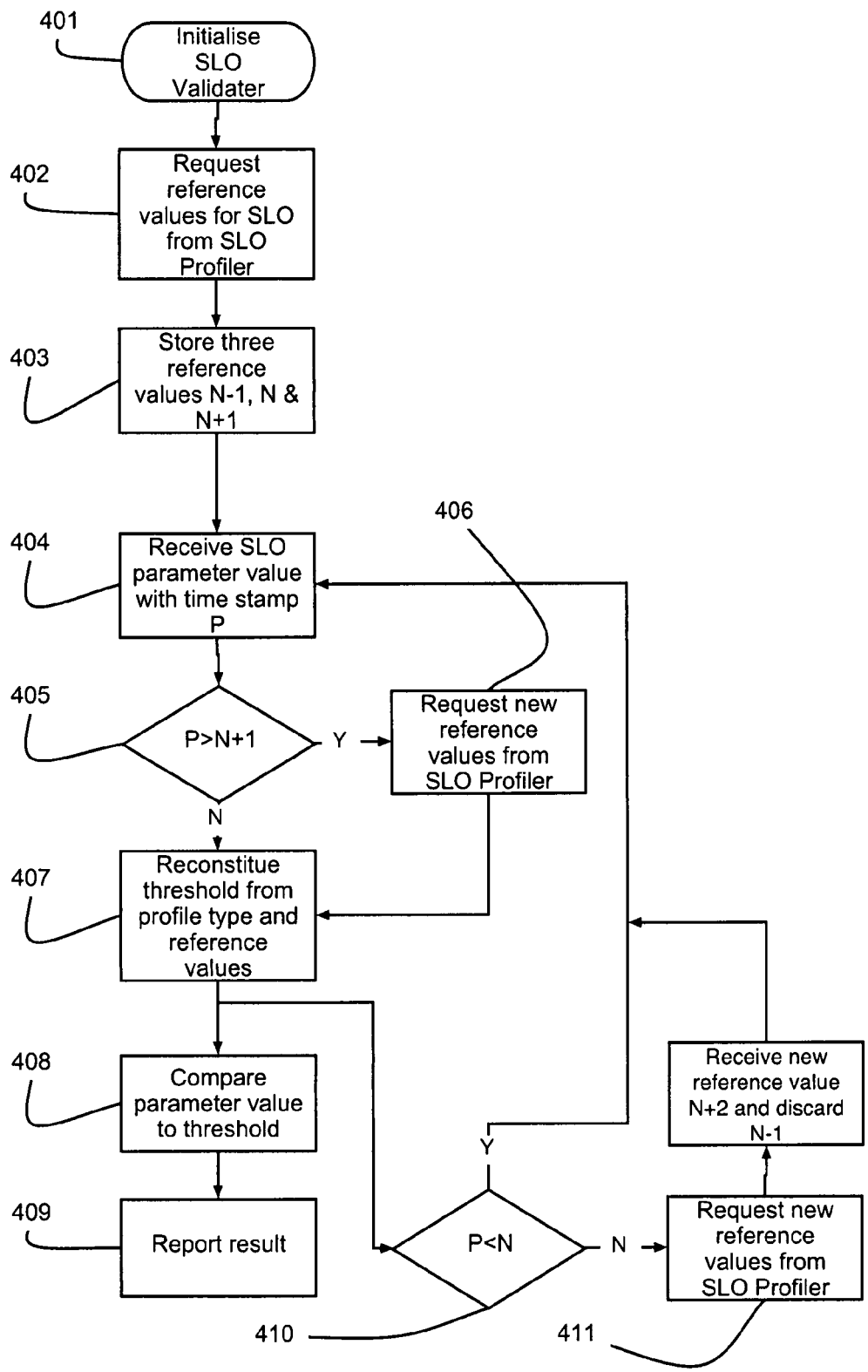

The processing carried out by the SLO validator 106 will now be described in further detail with reference to the flow chart of FIG. 4. At step 401, the SLO validator 106 is initialised by being linked to a data feed for a parameter value from a measurement point in the network 101. Also, the parameter value is associated with the appropriate one of the threshold profiles 201, 202, 203 for the SLO threshold function. Processing then moves to step 402, where a request is sent to the SLO profiler 108 for a set of three reference values. The request includes a dummy time stamp P having a null value. Processing then moves to step 403 where the initial sequence of reference values for the SLO are received and stored and processing moves to step 404 to await a parameter value from the measurement point. When a parameter value and its associated time stamp P is received, processing moves to step 405.

At step 405, the time stamp P is compared to the latest reference value N+1. If P is later than the latest reference value N+1, this indicates that the stored reference values are too old to be useful and thus processing moves to step 406 where new reference values are requested and received from the SLO profiler 108. Processing then moves on to step 407. If, at step 405, P is earlier than the latest reference value N+1, this indicates that the stored reference values are contemporaneous and processing moves to step 407.

At step 407, a portion of the threshold function around the time stamp P is reconstituted from the stored reference values N−1, N, N+1 and the selected threshold profile. From step 407, the processing splits into two threads. One processing thread moves to step 408 where the parameter value received at step 404 is compared to the reconstituted threshold to determine if the SLO is being satisfied. At step 409, the result of the comparison is recorded for later use by the SQM system. The other processing thread from step 407 moves to step 410 where the time stamp P is compared to the middle reference value N. If P is later than the middle reference value N, this indicates that the oldest reference value N−1 is now too old to be useful and thus processing moves to step 411 where reference values are requested from the SLO profiler 108. Processing then moves to step 407 where a new reference value N+2 is received and the oldest reference value N−1 discarded. Processing then returns to step 404, to await receipt of a further parameter value as described above. If, at step 405, P is earlier than the middle reference value N, this indicates that the stored reference values are contemporaneous and processing returns to step 404 as described above.

By working with only a portion of the SLO threshold at any given time, the SLO validator has a small memory requirement. Furthermore, the SLO validator does not require re-engineering when a SLO threshold is changed, it simply requires an incoming parameter, reference values and an associated threshold profile. Also, the data transfer and communication between the SLO validator and the SLO profiler is minimised.

In another embodiment, only one SLO is stored by a single instance of the SLO profiler. Further instances of the SLO profiler may be provided, each supporting a single SLO. In a further embodiment, further threshold profiles are provided which define further threshold characteristics. In another embodiment, the threshold profiles may be varied for a given SLO with respect to time or some other variable. In a further embodiment, a threshold profile is supplied to the SLO validator each time reference values are supplied. In a further embodiment, in step 407, only the two reference values closest to the time stamp P are used to reconstitute the SLO threshold. In another embodiment, the SLO threshold is not time dependent but dependent on some other variable which may itself be a parameter value. In a further embodiment, the time stamp P is not supplied to the SLO profiler but instead the SLO validator makes a request for either updated or replacement reference values and receives reference value N+2 or N'−1, N' and N'+1 respectively.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A computer-implemented method for verifying a parameter value against a predetermined threshold function, said method comprising the steps of:
   a) retrieving a sequence of three reference values, each reference value being associated with respective time based sampling points N−1, N and N+I, said reference values representing a threshold function at said respective sampling points N−1, N and N+I;
   b) associating a profile type with said threshold function;
   c) receiving a parameter value for verification against said threshold function, said parameter value being associated with a discrete time P;
   d) combining at least some of said sequence of reference values with said profile type to provide an approximation of said threshold function for a region of said threshold function between said reference values; and
   e) verifying said parameter value against said approximation of said threshold function.

2. A method according to claim 1 in which said sequence of reference values comprises three reference values but in step d) only the two reference values associated with sampling points N closest to said time P are combined with said profile type.

3. A method according to claim 2 in which said method comprises a further step of comparing said time P to said sampling points and if N<=P<=N+1, then replacing said reference value N−1 with a new reference value N+2 for use with a subsequently received parameter value.

4. A method according to claim 2 in which said method comprises a further step of comparing said time P to said sampling points and if P<N+1, then replacing said sequence with a further sequence of reference values N'−1, N' and N'+1 for use in step e).

5. An apparatus for verifying a parameter value against a predetermined threshold function, said apparatus being configured to:

retrieve a sequence of three reference values, each reference value being associated with respective time based sampling points N−1, N and N+1, said reference values representing a threshold function at said respective sampling points N−1, N and N+1;

associate a profile type with said threshold function;

receive a parameter value for verification against said threshold function, said parameter value being associated with a discrete time P;

combine at least some of said sequence of reference values with said profile type to provide an approximation of said threshold function for a region of said threshold function between said reference values; and verify said parameter value against said approximation of said threshold function.

6. An apparatus according to claim 5 in which said sequence of reference values comprises three reference values but only the two reference values associated with sampling points N closest to said time P are combined with said profile type.

7. An apparatus according to claim 6 in which said apparatus is further configured to compare said time P to said sampling points and if N<=P<=N+1, then replace said reference value N−1 with a new reference value N+2 for use with a subsequently received parameter value.

8. An apparatus according to claim 6 in which said apparatus is further configured to compare said time P to said sampling points and if P<N+1, then replace said sequence with a further sequence of reference values N'−1, N' and N'+1 for use in verifying said parameter value against said approximation of said threshold function.

9. A computer-readable medium with program code embodied therein for causing when executed, a computer system, to perform a method of:

a) retrieving a sequence of three reference values, each reference value being associated with respective time based sampling points N−1, N and N+1, said reference values representing a threshold function at said respective sampling points N−1, N and N+1;

b) associating a profile type with said threshold function;

c) receiving a parameter value for verification against said threshold function, said parameter value being associated with a discrete time P;

d) combining at least some of said sequence of reference values with said profile type to provide an approximation of said threshold function for a region of said threshold function between said reference values; and e) verifying said parameter value against said approximation of said threshold function.

10. A computer-readable medium according to claim 9, wherein said sequence of reference values comprises three reference values but in step d) only the two reference values associated with sampling points N closest to said time P are combined with said profile type.

11. A computer-readable medium according to claim 9, wherein said method comprises a further step of comparing said time P to said sampling points and if N<=P<=N+1, then replacing said reference value N−1 with a new reference value N+2 for use with a subsequently received parameter value.

12. A computer-readable medium according to claim 9, wherein said method comprises a further step of comparing said time P to said sampling points and if P<N+1, then replacing said sequence with a further sequence of reference values N'−1, N' and N'+1 for use in step e).

* * * * *

UNITED STATES PATENT AND TRADEMARK OFFICE
CERTIFICATE OF CORRECTION

| | | |
|---|---|---|
| PATENT NO. | : 7,836,026 B2 | Page 1 of 1 |
| APPLICATION NO. | : 11/785711 | |
| DATED | : November 16, 2010 | |
| INVENTOR(S) | : Christophe Laye et al. | |

It is certified that error appears in the above-identified patent and that said Letters Patent is hereby corrected as shown below:

In column 6, line 39, in Claim 1, delete "N+I," and insert -- N+1, --, therefor.

In column 6, line 41, in Claim 1, delete "N+I;" and insert -- N+1; --, therefor.

Signed and Sealed this
Fifth Day of April, 2011

David J. Kappos
*Director of the United States Patent and Trademark Office*